(12) United States Patent
Moran et al.

(10) Patent No.: US 7,822,062 B2
(45) Date of Patent: Oct. 26, 2010

(54) NETWORK MANAGEMENT USING DYNAMIC RECOVERY AND TRANSITIONING

(75) Inventors: William J. Moran, Wesley Chapel, FL (US); Michael T. Bayne, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 745 days.

(21) Appl. No.: 11/615,255

(22) Filed: Dec. 22, 2006

(65) Prior Publication Data
US 2008/0151931 A1    Jun. 26, 2008

(51) Int. Cl.
*H04L 12/26* (2006.01)
(52) U.S. Cl. .................................... 370/466
(58) Field of Classification Search ................. 370/465, 370/466, 467
See application file for complete search history.

(56) References Cited

U.S. PATENT DOCUMENTS 6,865,737 B1 *  3/2005  Lucas et al. ................. 717/178
2003/0204612 A1 * 10/2003  Warren ....................... 709/230

OTHER PUBLICATIONS

Microsoft Computer Dictionary, 5th Edition, Microsoft Press, May 2002, definition of "Priority".*

* cited by examiner

*Primary Examiner*—Melvin Marcelo

(57) ABSTRACT

Preferred embodiments of the invention provide systems and methods to receive a command associated with the network management system, define a work flow based on the command, and execute the work flow on a network element. During execution of the work flow, a network management system determines whether a recovery is necessary and performs a recovery based on a determination that a recovery is necessary.

24 Claims, 8 Drawing Sheets

201

NETWORK MANAGEMENT USING DYNAMIC RECOVERY AND TRANSITIONING

BACKGROUND INFORMATION

Direct interaction with network elements to change network configurations can result in ad hoc management of a network. Also, attempts to re-configure a network configuration may fail and network elements may need to be recovered.

BRIEF DESCRIPTION OF THE DRAWINGS

In order to facilitate a fuller understanding of the exemplary embodiments of the disclosure, reference is now made to the appended drawings. These drawings should not be construed as limiting, but are intended to be exemplary only.

DETAILED DESCRIPTION OF PREFERRED EMBODIMENTS

A system and process of an exemplary embodiment of the disclosure provides dynamic work flow rollback and dynamic work flow transitioning within a network management system.

Figure 1:
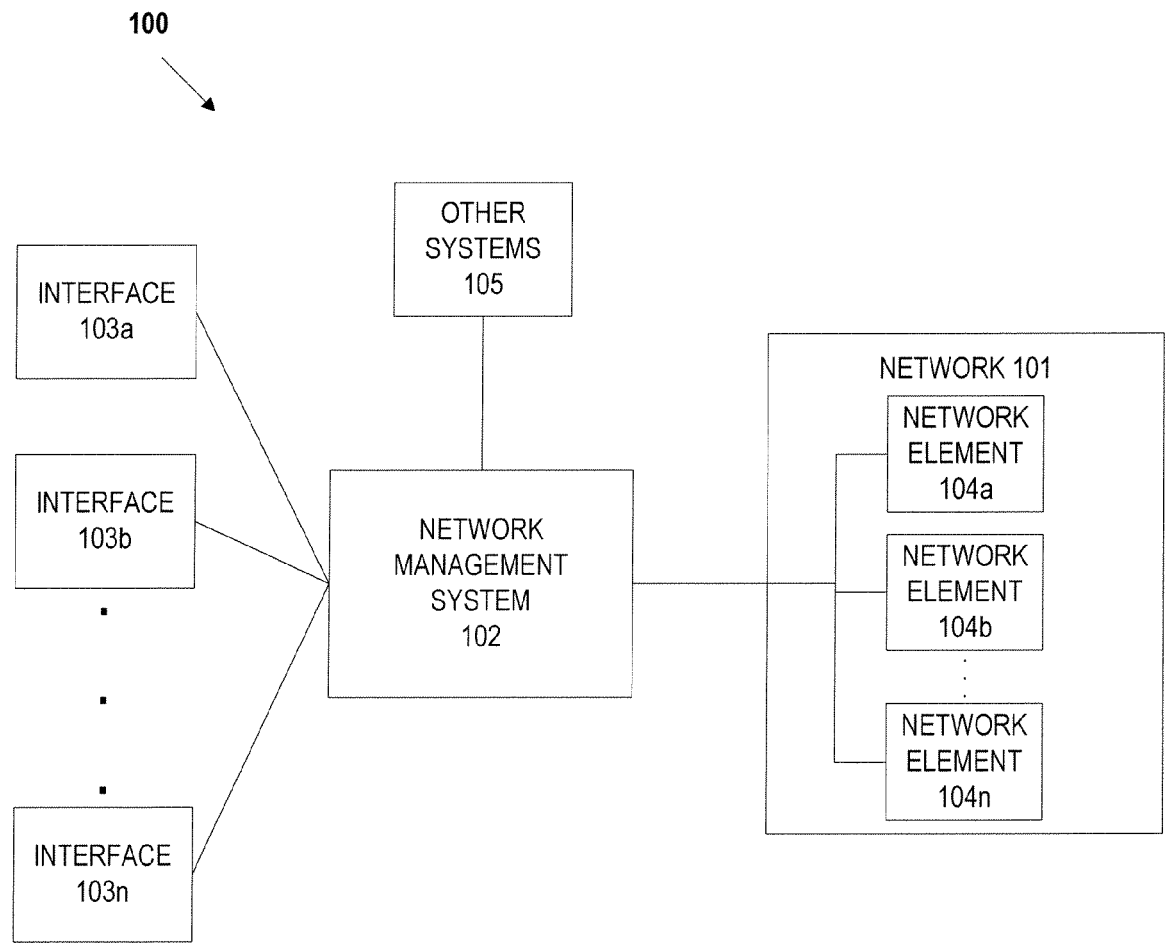
FIG. 1 illustrates an exemplary implementation of a system according to an embodiment of the disclosure.

FIG. 1 is an exemplary network system according to an embodiment of the disclosure. System 100 illustrates an exemplary system for supporting telecommunication networks, such as packet-switched based networks and/or circuit-switched based networks. As illustrated, one or more interfaces 103a-103n may be coupled to network management system 102 and network management system 102 may be coupled to network 101. The various components of system 100 may be further duplicated, combined and/or integrated to support various applications and platforms. Additional elements may also be implemented in the system to support various applications. Also, while one configuration is shown in FIG. 1, other configurations of these various units may also be implemented. For example, the various components of system 100 may be components within network 101 and network 101 may include one, or any number of the exemplary types of networks operating as a stand alone network or in cooperation with each other.

In various exemplary embodiments, network 101 may comprise one or more packet-switched based networks and/or circuit-switched based networks. As such, network 101 may include, for example, one or more Internet Protocol (IP) networks, wireless communication networks, and/or access networks including, without limitation, dial-up networks, digital subscriber line (DSL) networks, broadband wireless access networks, cable modem networks, integrated services digital networks (ISDN), symmetric high-speed digital subscriber line (SHDSL) networks, Ethernet networks, metro Ethernet networks, gigabit Ethernet networks, frame relay networks, asynchronous transfer mode (ATM) networks, synchronous optical networking (SONET) networks operating as a stand alone network or in cooperation with each other.

Network 101 may be associated with an entity and may provide network connectivity to its users (e.g., customers) For example, network 101 may be associated with a network access provider such as an Internet service provider (ISP) and or any other network access provider that may provide network connectivity to enable users (e.g., customers) of the network to transmit information via network 101; a global network provider such as an Internet backbone provider that may provide Internet backbone connection facilities around the world; a telephone network provider that may be part of a public switch telephone network; and/or a wireless communication network provider that may provide wireless broadband and/or mobile phone services to its users (e.g., customers).

Network 101 may be comprised of one or more network elements 104a-104n. In various exemplary embodiments, network elements 104a-104n may represent, for example, addressable, manageable hardware device(s) and associated software that may perform a telecommunication service function. Network elements 104a-104n may include, without limitation: devices associated with level one of the Open Systems Interconnection (OSI) reference model such as add/drop multiplexers, optical add/drop multiplexers, and/or like devices; devices associated with level two of the Open Systems Interconnection (OSI) reference model such as an asynchronous transfer mode (ATM) switch and/or any other like device; devices associated with level three of the Open Systems Interconnection (OSI) reference model such as routers, switches, and or any other like devices; and/or any other computer networking device that may transmit data across a network. In various exemplary embodiments, network elements 104a-104n may also represent, for example, automated telephone exchanges, digital switches, and/or other like devices associated with the public switch telephone network (PSTN).

The entity or entities associated with network 101 may manage network 101 via network management system 102. As illustrated in FIG. 1, network management system 102 may be coupled to network 101 and interfaces 103a-103n. In various exemplary embodiments, network management system 102 may provide a scalable network management application, for example, to manage devices (e.g., network elements 104a-104n) on network 101. Network management system 102 may also provide a web-based interface across Open Systems Interconnection (OSI) layers for network elements 104a-104n. Network management system 102 may also be coupled to other systems 105 and provide seamless integration with other systems 105. Other systems may include, for example, provisioning systems, operational support systems (OSS), and fault, configuration, accounting, performance, and security (FCAPS) systems.

Network management system 102 may support various functions associated with the management of network 101. For example, network management system 102 may support activation needs for provisioning requests to network elements 104a-104n; auto-discovery, reporting, reconciliation, and restoration needs for provisioning platforms; capabilities similar to those of an enterprise management system; and the ability to view or make changes to virtual devices without accessing the network element directly as described in greater detail below. In various exemplary embodiments, network management system 102 may be associated with users that may use network management system 102 to manage network 101, for example, and administrators that may configure and/or manage the network management system. Users may also refer to automated systems associated with the network management and/or users of other systems 105 and interfaces 103a-103n. Also, users may be administrators and whether a user may act as an administrator may be dependent upon privileges associated with the user as described in greater detail below.

Interfaces 103a-103n may represent any number of interfaces associated with supporting network management tasks. In various exemplary embodiments, interfaces 103a-103n may be referred to as northbound interfaces. As such, interfaces 103a-103n may send various logical requests to network management system 102, which may then transform the logical requests into native commands to a network element, for example. In an exemplary embodiment, interfaces 103a-103n may be associated with provisioning systems, operational support systems (OSS), and fault, configuration, accounting, performance, and security (FCAPS) systems. Accordingly, while FIG. 1 illustrates interfaces 103a-103n as being separate from other systems 105, other configurations may also be implemented. For example, interfaces 103a-103n may be interfaces to other systems 105.

Figure 2:
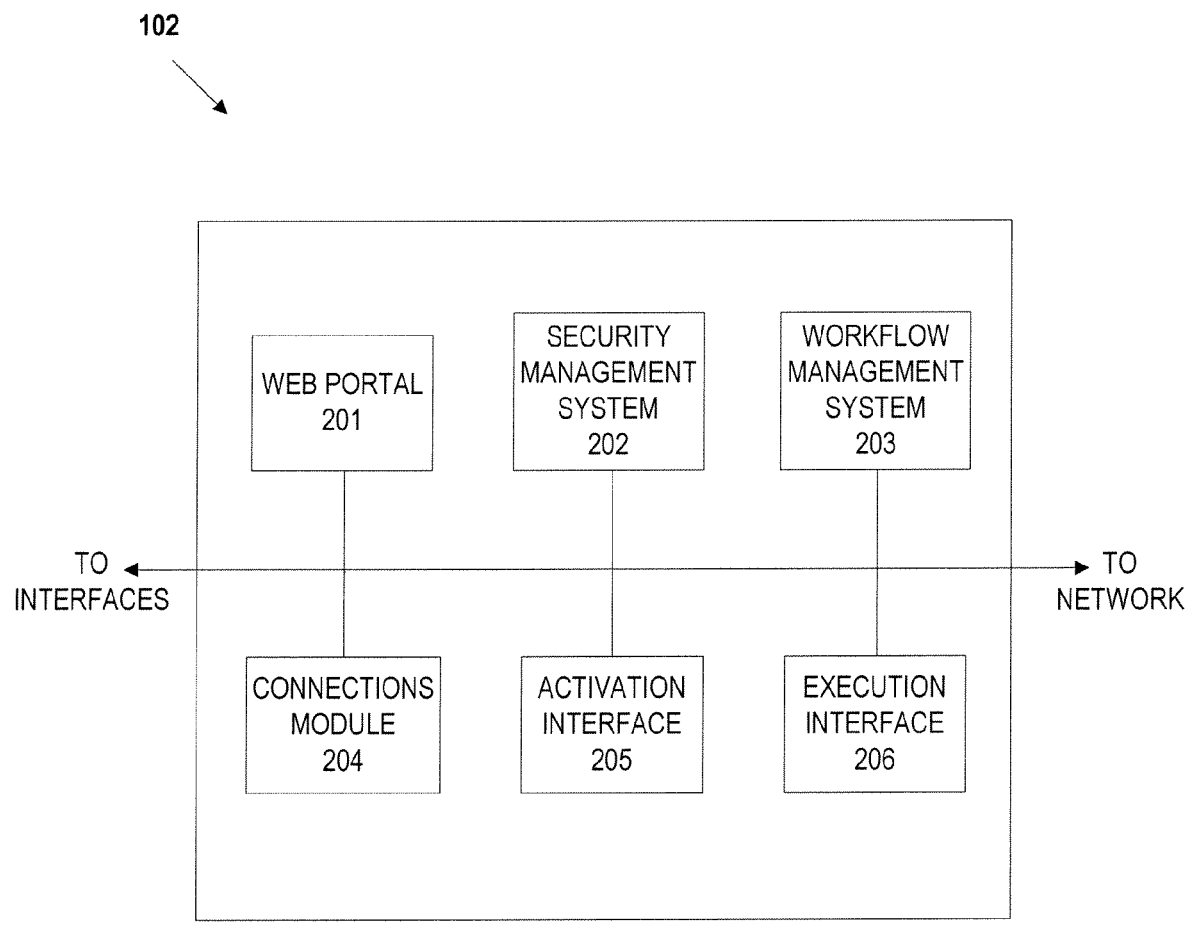
FIG. 2 illustrates an exemplary implementation of a network management system according to an embodiment of the disclosure.

FIG. 2 illustrates a network management system 102 according to various embodiments of the disclosure. As shown in FIG. 2, network management system 102 may include web portal 201, security management system 202, workflow management system 203, connections module 204, activation module 205, and execution module 206.

Figure 3:
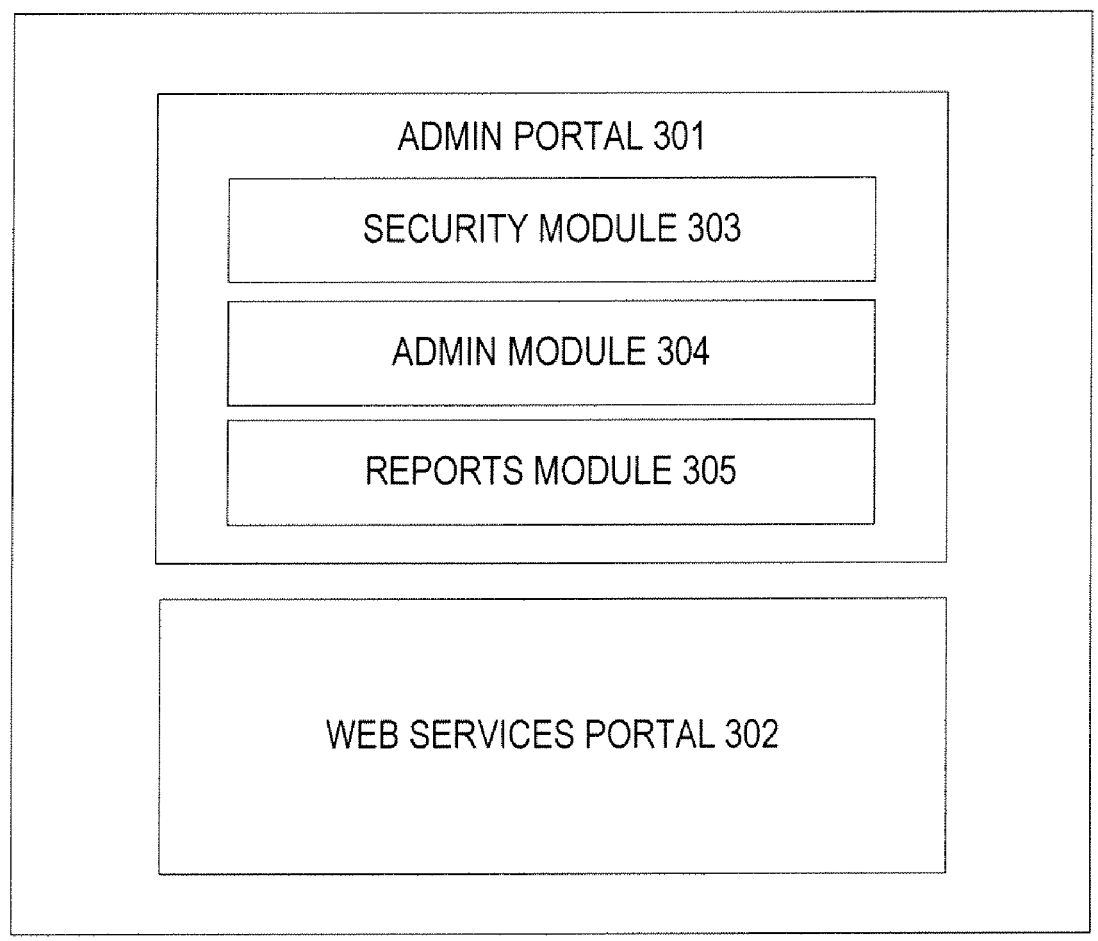
FIG. 3 illustrates an exemplary implementation of a web portal according to an embodiment of the disclosure.

FIG. 3 illustrates a web portal 201 according to various embodiments of the disclosure. As shown in FIG. 3, web portal 201 may include admin portal 301 and web services portal 302. Admin portal 301 may include security module 303, admin module 304 and reports module 305. Web portal 201 may provide a single interface to manage all activities associated with a network. For example, web portal 201 may provide a graphical user interface (GUI) that enables a single access point to all network elements within a network such that users may execute commands on a network element, add, delete, or modify network element configurations, troubleshoot and resolve network problems, and/or backup and restore deleted configurations. Web portal 201 may also provide a graphical user interface (GUI) that allows an administrator, for example, to add, delete or modify user profiles of users and/or user groups of the network management system, track all actions performed by users of the network management system, send messages to users of the network management system, run reports based on information contained within the network management system, and/or create credentials and map users that may be permitted to access a network element.

Figure 4:
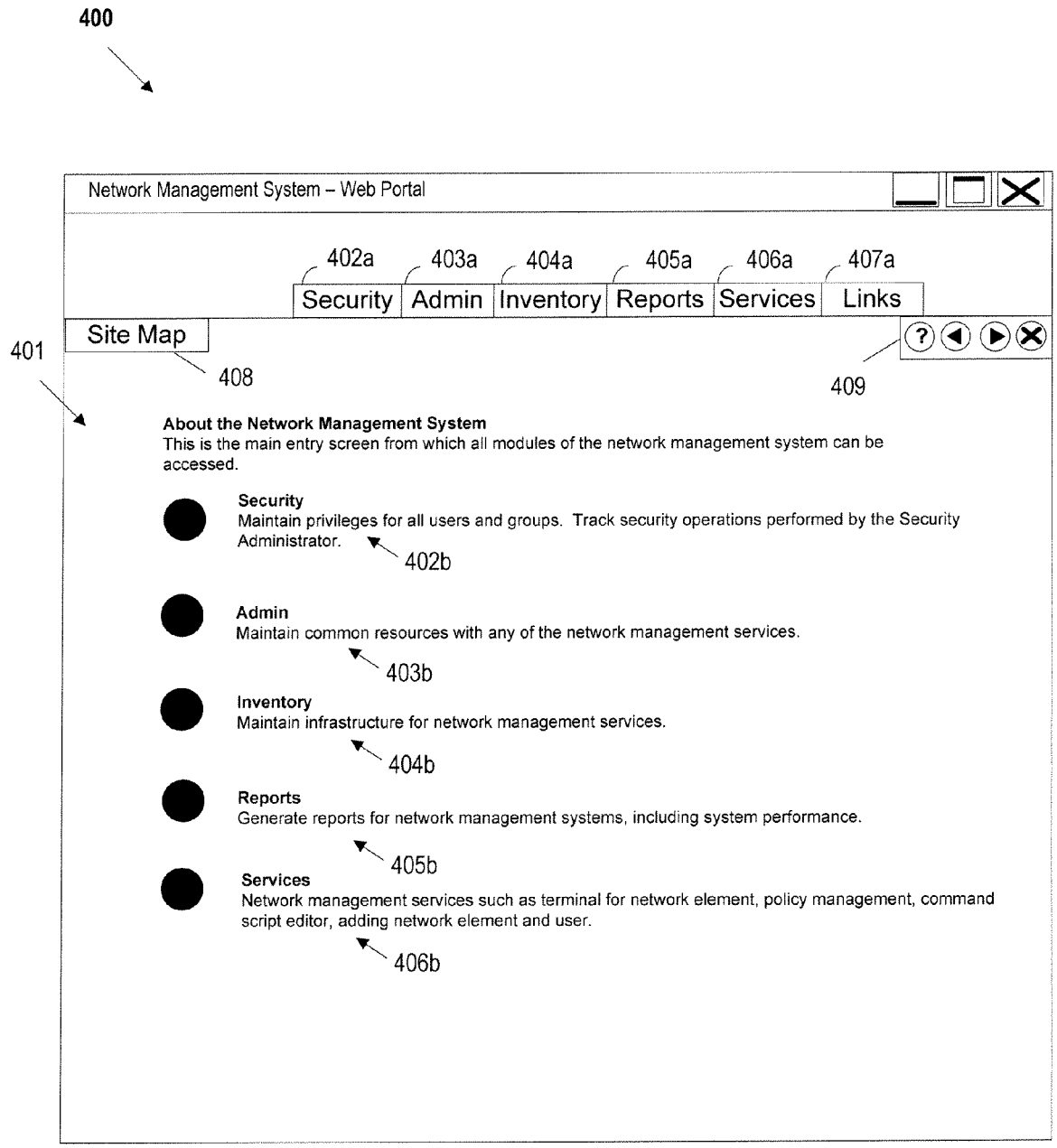
FIG. 4 illustrates an exemplary screen diagram of a web portal according to an embodiment of the disclosure.

In various exemplary embodiments, web portal 201 may be organized based on tabs. FIG. 4 depicts an exemplary embodiment of a screen diagram 400 which illustrates a web portal based on tabs. Screen diagram 400 may represent a graphical user interface (GUI) as described above with respect to web portal 201. Screen diagram 400 may include a main page 401 that may provide a main entry screen from which all modules of the network management system can be accessed. As shown in FIG. 4, screen diagram 400 may also include security tab 402a, admin tab 403a, inventory tab 404a, reports tab 405a, services tab 406a, and links tab 407a.

Each tab may enable users of the network management system to access different information and/or services associated with the respective tab. Also, each tab may be associated with different modules and/or portals of the network management system. For example, security tab 402a may be associated with a security module, admin tab 403a may be associated with an admin module, inventory tab 404a may be associated with an operations portal, reports tab 405a may be associated with a reports module, and services tab 406a may be associated with a web services portal.

Screen diagram 400 may also include various links on main page 401 that may be associated with the respective tabs. For example, main page 401 may include a security link 402b that may be associated with security tab 402a, an admin link 403b that may be associated with admin tab 403a, an inventory link 404b that may be associated with inventory tab 404a, a reports link 405b that may be associated with reports tab 405a, and a services link 406b that may be associated with services tab 406a. In an exemplary embodiment, if a user of the network management system wishes to navigate to one of the modules and/or portals associated with a tab, the user may activate (e.g., click on) the tab and/or the link, for example.

Screen diagram 400 may also include other navigational tools such as a site map button 408 and navigation buttons 409, which may enable a user of the network management system to navigate through the web portal or access a help page, for example.

Referring back to FIG. 3, in various exemplary embodiments, admin portal 301 may include a security module 303 which may allow an administrator to manage users of a network management system. Users of the network management system may be assigned privileges within the network management system by way of the roles, groups, and organizations to which they are associated.

Roles, for example, may be inherited by a user based on a user's group or organization. Exemplary roles may include, without limitation, system admin, admin, user, manager, and complex services user. Each role may include tab permission levels to determine whether or not a user can modify or view data. The tab permission levels may be associated with various tabs of a web portal as shown an described with respect to FIG. 4. For example, if a role has view privileges for a tab associated with the web portal, then the user may only view the data and not modify the data associated with the tab. Similarly, if a role has modify privileges for a tab, a user may modify the data associated with the tab.

User groups and/or organizations may represent a collection of users of the network management system that may have a common purpose within an organization associated with the network. For example, one user group may represent all users who share a similar job function. Also, a user group may represent all users who have access to a particular network element and/or group of network elements. For example, one user group may represent all users who have access to the network elements associated with a particular network operation center (NOC). User groups may also represent all users within a specific geographic region.

In various exemplary embodiments, an administrator may add and/or delete users and/or modify information associated with users. For example, security module 303 may include an "add user" tab that may enable an administrator to add a user and provide information associated with a user to create a user profile. The "add user" tab may include a "user information" tab and a "user privileges" tab which may provide an interface to enter information about a user and the privileges (e.g., roles and organizations) associated with the user, respectively. Security module 304 may also include a "modify user" tab that may enable an administrator to modify the information associated with users of the network management system. To modify the information associated with a user the "modify user" tab may enable a search for the respective user provide fields of information that may be modified. Security module 304 may also enable the administrator to delete users.

Security module 303 may also include an "audit trail" tab that may enable an administrator to track security-related actions on a per-user basis and/or a "command audit" tab that may enable an administrator to track all commands on a network element. For example, via an "audit trail" tab, an administrator may identify a user and track which network elements the user accessed. Similarly, via a "command audit" tab, an administrator may identify a particular network element and track all commands and/or requests that that may have been executed or are scheduled to be executed on a network element.

Admin portal 301 may also include an admin module 304 which may enable communication between and among users of the network management system. For example, admin module 304 may enable administrators to send banner messages to users of the network management system. In various exemplary embodiments, admin module 304 may include a "message center" tab that may enable an administrator to send a message to one or more users. Using the "message center" tab, an administrator, for example, may select individual users (by selecting a specific user identifier) or a group of users (by selecting a user group) and enter a message to be sent to the selected users. Users may also be able to send messages to other users using, for example, the "message center" tab. In doing so, users may be able to send message to other users based on privileges associated with the user sending the message.

Admin portal 301 may also include a reports module 305 which may enable reports to be generated that are related to, for example, the activities of users within the network management system. For example, reports module may enable "181 Day Reports" to be generated which may display a list of users who have not accessed the network management system in 181 days. In various exemplary embodiments, reports module 306 may enable the generation of other reports that may provide information about, for example, which network elements a particular user accessed, what commands were executed on a particular network element, and/or the like.

Figure 5:
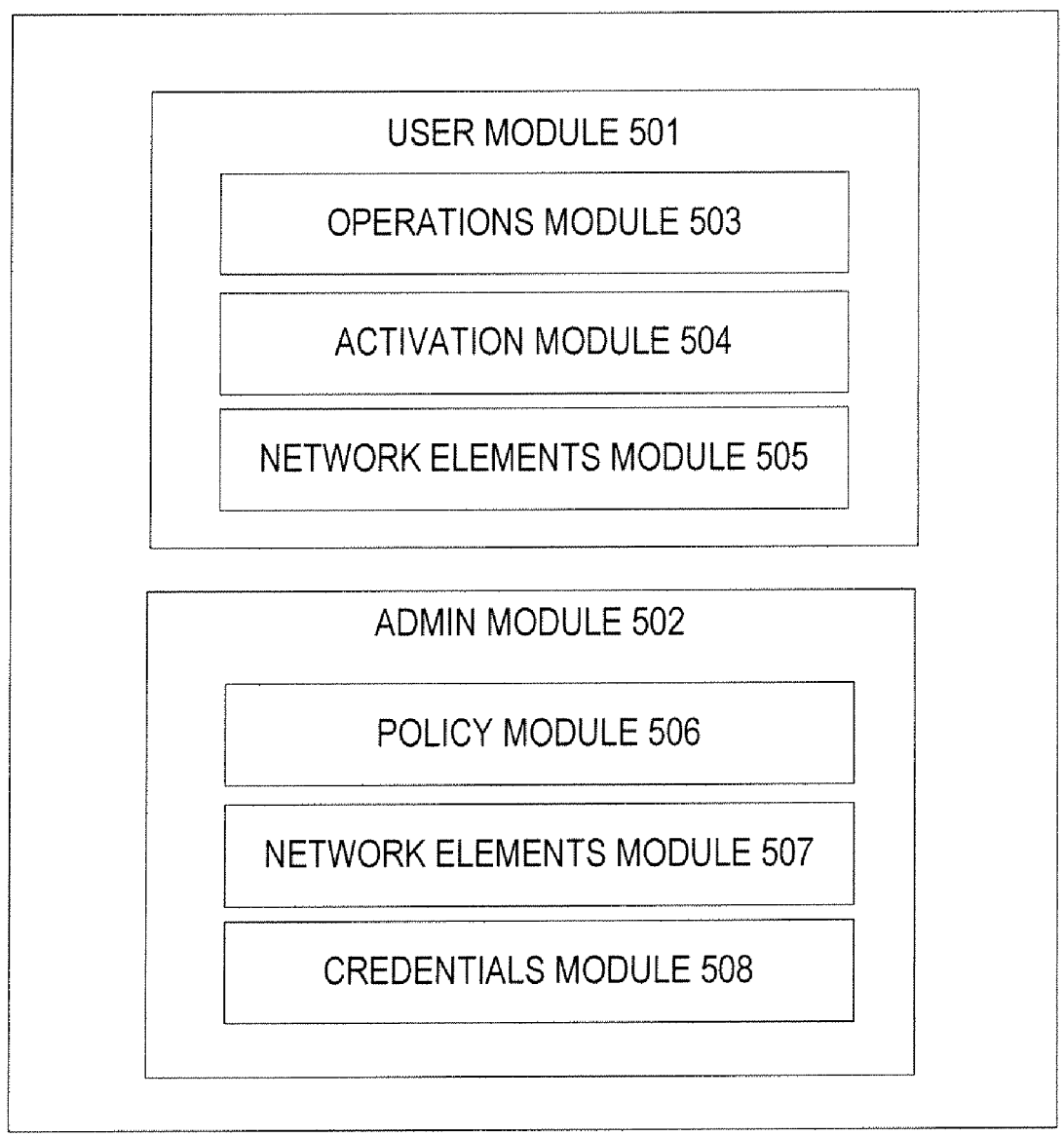
FIG. 5 illustrates an exemplary implementation of a web services portal according to an embodiment of the disclosure.

FIG. 5 depicts an exemplary embodiment of a web services portal 302 according to various embodiments of the disclosure. As shown in FIG. 5, web services portal 302 may include a user module 501 and an admin module 502. User module 501 may include an operations module 503, an activation module 504, and a network elements module 505. Admin module 502 may include a policy module 506, a network elements module 507, and a credentials module 508.

Operations module 503 may enable users of the network management system to execute commands on a network element and/or add, modify and/or delete network element configurations. Operations module 503 may also provide secure access to network elements to enable users to troubleshoot and resolve network problems.

Operations module 503 may include an "terminal" tab that may enable users to connect to a network element and enter commands to be executed on the network element. In an exemplary embodiment of the invention, to access the network element, operations module may log on to the network element in a manner that may be transparent to the user as described in greater detail below. Also, operations module 503 may batch all commands entered during a session and then commit the commands to the network element at one time, for example.

Figure 6:
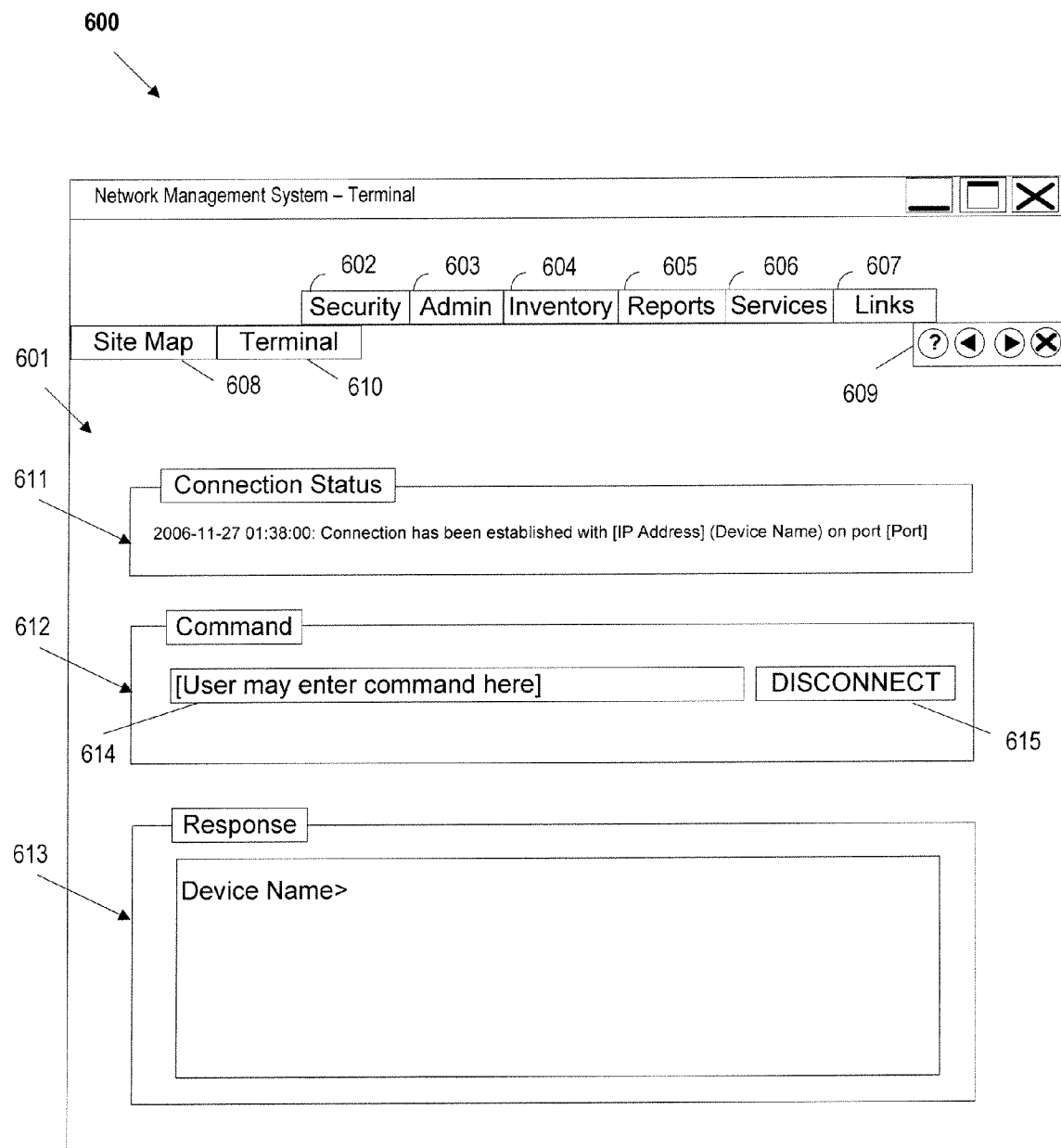
FIG. 6 illustrates an exemplary screen diagram of an operations module according to an embodiment of the disclosure.

FIG. 6 depicts an exemplary embodiment of a screen diagram 600 which illustrates an exemplary "terminal" tab according to various embodiments of the disclosure. As shown in FIG. 6, screen diagram 600 may include a "terminal" tab 601 which may be accessed by activating (e.g., clicking on) terminal tab button 610. Screen diagram 600 may also include a security tab 602 which may be similar to security tab 402*a* as described above, an admin tab 603 which may be similar to admin tab 403*a* as described above, an inventory tab 604 which may be similar to inventory tab 404*a* as described above, a reports tab 605 which may be similar to security tab 405*a* as described above, a services tab 606 which may be similar to security tab 406*a* as described above, a links tab 607 which may be similar to links tab 407*a* as described above, a site map button 608, navigation buttons 609, connection status portion 611, command portion 612, and response portion 613.

Using, information about a network element such as a network element identifier, protocol type, Internet protocol (IP) address and/or port number, a user may search for and locate a device (e.g., network element) that the user desires to access. In an exemplary embodiment, a user may only access network elements that the user has privileges to access based on the user's role and/or organization. Similarly, a user may only execute commands that the user has privileges to execute based on policies that may be associated with the user and/or user credentials.

Once a user has identified and/or accessed a network element, a user may interact with the network element via "terminal" tab 601. As shown in FIG. 6, connection status portion 611 may display the status of the connection between the network management system and the network element. For example, connection status portion 611 may indicate "Connection has been established with [IP Address] (Device Name) on port [Port]", where [IP address represents an Internet protocol (IP) address of the network element, "(Device Name) represents a unique identifier of the device, and "[Port] represents the port number. Using command portion 612, a user may enter commands into command field 614. For example, a user may enter transaction language one (TL1), common object request broker architecture (CORBA), command line interface (CLI), and/or other like commands into command field 614. In various exemplary embodiments, different network elements may support different command sets. In these embodiments, the network management system may validate the different types of commands and commit the commands to the network element as described in greater detail below. Once the commands are entered, the commands may be displayed in response portion 613, for example. As noted above, operations module 503 may batch all commands entered during a session and then commit the commands to the network element at one time. Users may also activate (e.g., click on) disconnect button 615 to disconnect from a network element. Once disconnected, connection status portion 611 may indicate "Not Connected," for example.

Referring back to FIG. 5, activation module 504 may enable users to add, modify and/or manage scripts for other systems (e.g., other systems 105) that may interface with the network management system. In various exemplary embodiments, data sent from other systems may be converted into, for example, transaction language one (TL1) commands. The scripts may represent a set of commands that an other system may apply to a network element.

In various exemplary embodiments, a script may include, without limitation, the following three components: a tree structure, a validation script, and a configuration script. The tree structure may represent the extensible markup language (XML) command structure. The validation script may include a set of commands that may verify what already exists in the network element before performing a configuration script. For example, where a configuration script is associated with a cross connect, the validation script may validate whether a cross connect exists before executing a configuration script to establish the cross connect and utilize the ports. The configuration script may add, modify, and/or delete data. For example, a configuration script may create a cross connect. Other configuration scripts may define an Internet protocol (IP) interface, create a subnet, and build a border gateway protocol (BGP) interface to a neighbor router.

Activation module 504 may include an "activation template" tab that may enable users to add modify and manage template scripts. Template scripts may be used repeatedly to perform a particular task associated with a particular network element. Activation template scripts may be associated with a particular network element and/or type of network element. Also, users may access templates based on privileges of the user. Using the "activation template" tab, users having requisite privileges may add, modify and/or delete template scripts to be executed by themselves and/or other users.

Activation module 504 may also include an "activation request" tab that may enable users to select an activation template and execute the script associated with the selected template on a network element. In various exemplary embodiments, this "activation request" tab may provide an alternate to issuing commands using, for example, the "terminal" tab as described above. Also, the "activation request" tab may enable users to schedule scripts to execute at a future date and time. When executing a script and/or template script, users may enter, for example, network element inputs and/or script input inputs that may be inserted into variable fields in the script. Users may also be able to preview the script having the inputs inserted into the variable fields before execution.

Network elements module 505 may enable users to add, delete, and/or modify network element configurations. Network elements module 505 may include an "add element" tab which may include various fields within which users may enter information about a network element. For example, the "add element" tab may include fields associated with a unique identifier, a host name of the network element, a device type to specify the model name for the network element, a device version to specify the release version of the network element, an Internet protocol (IP) address, a port number, a credential, a loop back, and or any other information associated with a network element. To add a network element, users may enter the information into the input fields and activate (e.g., click on) an add button associated with the "add element" tab.

To modify or delete a network element, users may search for the network element and once located, modify or delete the network element details, for example. A user may add, modify, and/or delete network element details based on the privileges associated with the user.

As noted above, admin module 502 may include a policy module 506. In various exemplary embodiments, a policy may refer to a set of commands that determine the commands a particular user and/or group of users may execute. Policy module 506 may enable administrators, for example, to add, delete, and/or modify a policy, and/or apply a policy to a group, role, user, or network element.

Admin module 502 may include a "manage policy" tab that may enable an administrator to manage the policies within the network management system. To create or modify a policy, an administrator may select a device from a list of devices displayed within the "manage policy" tab. Once selected, an administrator may view, for example, a list of commands that are permitted for that network element.

In various exemplary embodiments, a policy may be identified by an alphanumeric identifier. To add a policy, an administrator may locate a network element and enter an alphanumeric name into, for example a name field within the "manage policy" tab to associate the network element with the name of the policy. Each policy may have an associated default policy which may determine how the permissions will work. Exemplary default policies may include, without limitation, allow, deny, and/or abstain. Allow may represent that, by default, all commands may be allowed, except, for example, those commands that may be explicitly flagged by add, modify, delete, and/or query permission flags. Deny may represent that, by default, commands may be denied, except, for example, those commands that may be explicitly flagged by add, modify, delete, and/or query permission flags. Abstain may represent that no behavior may be defined. In an exemplary embodiment, selecting abstain may result in an implicit deny of any command.

Within the "manage policy" tab, an administrator may associate add, modify, delete, or query permissions to a command. An administrator may also apply a policy to groups, users, roles, or network elements. Doing so may define what commands may be executed by certain group(s), user(s), role(s), and on what network elements.

Admin module 502 may also include a network elements module 507 that may enable an administrator, for example, to return a network element to a state of a previous provisioning in the system. Returning a network element to a state of a previous provisioning may provide disaster recovery for a network element, for example. Network elements module 507 may include a "network element reconcile" tab that may enable an administrator to locate a network element by searching for the network element and select any number of commands from a list of commands provided with the "network element reconcile" tab and re-execute the selected commands.

Admin module 502 may also include a credentials module 508 that may enable an administrator to map users and groups to a network element. In various exemplary embodiments, each network may be associated with a network element ID and a password. As described in greater detail below, the network management system to connect to the network element in a manner that may be transparent to a user. A user may not be able to access a network element until the user is mapped to the network element.

A credential may be associated with a credential name, a network element ID, and a password of the network element. Credentials module 508 may include a "credential mapping" tab that may enable an administrator to add a credential. To add a credential, the administrator may input information into, for example, credential name, network element, and network element password fields within the "credential mapping" tab. Once added, an administrator may associate users, user groups, and/or network element groups to the credential. Once a user is associated with a network element, the user may log on to the network element via the web portal, for example.

Referring back to FIG. 2, security management system 202 may provide generic security concepts to network management system 102 and network 101. For example, security management system 202 may provide credentials control, key escrow services, firewall rules management, access and controls specification, secured auditing and/or encryption/decryption services. These exemplary generic security concepts may then be utilized as a base services offering (i.e., a business delegate), to the network management system to provide a common mechanism for repetitive security-related events such as login credentials control to network elements.

In various exemplary embodiments, security management system 202 may also provide some or all of the data structures and/or algorithms associated with performing the functions of security module 303, policy module 506, network elements module 507, and/or credentials module 508 as described above.

Workflow management system 203 may manage work flow (or work unit flow) of the network management system. As described herein, work flow (or work unit flow) may represent a collection of work units. Generally, work flow may represent any operation performed by the network management system. For example, work flow may represent operations for connecting to a network element, communicating with a network, element, and/or interfacing with other systems. Programmatically, a work unit may represent an object that executes in the work flow and returns a state information to the workflow management system.

As noted above, network elements may represent addressable, manageable hardware device(s) and associated software that may perform a telecommunication service function. Each network element may expose one or more management interfaces that the network management system may use to communicate with and/or manage the network element. The management interfaces may use a variety of protocols, depending on the type of network element. These protocols may include, without limitation, simple network management protocol (SNMP), transaction language one (TL1), command line interface (CLI), extensible markup language (XML), common object request broker architecture (CORBA) and/or hypertext transfer protocol (HTTP).

In various exemplary embodiments, network management system 102 may provide a single interface to interact with a network element, regardless of the protocol used by the network element. Workflow management system 203 may define a different work unit type for each protocol. For example, workflow management system 203 may define a simple network management protocol (SNMP) work unit type, a transaction language one (TL1) work unit type, a command line interface (CLI) work unit type, extensible markup language (XML) work unit type, a common object request broker architecture (CORBA) work unit type, a hypertext transfer protocol (HTTP) work unit type and so forth.

Workflow management system 203 may manage interactions with numerous network elements at a given time. As noted above, to manage work flow, workflow management system 203 may use the state information returned by the work unit object. Although work unit objects may be defined for each protocol, workflow management system 203 may manage work flow using state transitions that are based upon patterns. In various exemplary embodiments, patterns may represent regular expressions that match data arriving on an incoming stream. Workflow management system may monitor incoming data streams for patterns that may be represented in three exemplary ways.

First, a good pattern may provide an indication to workflow management system 203 that the one or more operations specified in a command were performed successfully and that workflow management system can transition successfully. Second, a bad pattern may indicate that the transition was completed, the prompt was found, but an error message occurred during the runtime. Such an indication may mean that the transition is to enter a failure transition, for example. Moreover, when a bad pattern is identified, the workflow management system 203 may wait for a prompt from the network element. If an error message is received from the network element, there may be an unknown amount of time before the stream may flush to get caught up so the next pattern does not false hit on stream data. Third, an error pattern may indicate that a problem is found on the stream and the state of the link with the network element may no longer be important. If an error pattern is identified, the workflow management system 203 may enter an error state transition and allow for recovery.

Using the command line interface as an exemplary protocol, as noted above, workflow management system 203 may define a command line interface (CLI) work unit type. The command line interface (CLI) work unit type may be an object-oriented data structure that may define various functions for managing work flow. For example, the command line interface (CLI) work unit type may define a main execution function may send a command to a network element and wait for response patterns to be received from the network element. The command line interface (CLI) work unit may also define a command that may be sent to a stream and associated "get" and "set" functions to get and set the command, respectively. In an exemplary embodiment, the "get" function may return a string value that is associated with the command.

The command line interface (CLI) work unit may also define good, bad and/or error patterns and associated functions for "adding" good, bad, and/or error patterns. Within the definition of the command line interface (CLI) work unit, a good pattern may indicate to the command line interface (CLI) work unit the pattern(s), when found, that may force the work flow into a good transition state. In an exemplary embodiment, a good pattern may indicate that the prompt was found and no error was generated by the network element. An error pattern may indicate to the command line interface (CLI) work unit the pattern(s), when found, that may force the work flow into a bad transition state. In an exemplary embodiment, an error pattern may indicate that a prompt was found at the same time an error pattern was found. For example, the network element may return the prompt with a percentage sign (%) to indicate that an error occurred. In this instance, when a prompt is returned with an error indication (%), the stream returned may the be scrubbed by workflow management system 203 to determine the error pattern. Scrubbing the stream in this manner may enable workflow management system 203 to understand the stream and make future transitions possible. A bad pattern may indicate that total recovery should occur. For example, the state of the stream may contain an error that requires connection invalidation, recovery, re-login and/or back-out. A bad pattern may be identified by workflow management system 203 by directly examining the stream before the prompt is returned.

Other protocol work unit types may be defined and workflow management system 203 may manage work flow using state transitions that are based upon patterns associated with the respective work unit types.

Connections module 204 provide and manage connections between network management system 102 and remote facilities such as, e.g., network elements and/or other systems. As noted above, network management system 102 may connect to various network elements using a number of different protocols and ports. Connections module 204 may define a model for which all connections may adhere to and provide a common mechanism for interfacing with a connection pool manager, for example. In an exemplary embodiment, the model and mechanism may be defined as an object-oriented classes or like data structure.

The common model, as defined in connections module 204 may define one or more methods for enabling connections to remote facilities. For example, connections module 204 may define a method to create a connection and/or handle to a remote facility and initiate credentials by executing the login workflow. In an exemplary embodiment, the creation of a connection may be executed as part of the work flow and managed by workflow management system 203. Connections module 204 may also define a method to close resources in use by a connection and remove a connection to a remote facility.

In various exemplary embodiments, depending on the protocol associated with a connection, connections module 204 may define a method to flush any data from a connection so that operations may start over.

Connections module 204 may also define a method that may validate the stability of a connection and return true if the connection id valid, or false otherwise. The implementation of this method may vary based on the protocol that is associated with a connection. Also, in an exemplary embodiment, method may provide an indication that a communication vehicle is valid, but not an indication of a logged in state.

Connections module 204 may also define methods to set the state of the connection, set and/or return the workflow utilized to keep the connection alive during idle periods, validate that a connection is in a "logged in" stat and that the connection is properly open, return a cache utilized in a connection, override a default cache created during object creation, store a connection pool manager, return a connection pool manager for a session, set a session identification for a current session, and/or return a stored session identification for the current session. In various exemplary embodiments, the session identification may be utilized by a connection pool manager to identify a connection.

As noted above, connections module 204 may provide a common mechanism for interfacing with a connection pool manager. Accordingly, connections module 204 may define a session manager to manage a connection pool. In various exemplary embodiments, the session manager may be defined as an object-oriented class and/or data structure. The session manager may define a function to "get" a connection. In an exemplary embodiment, given a session parameter, the function to "get" a connection may return a new connection from a pool or as a newly created connection. In such an embodiment, the session parameters may provide session specific data to generate the connection and/or pull a connection from a pool. The session manager may also define a "return" connection function that may return the connection back to a pool so that the connection may be returned back to a connection pool to be used by another thread that may require access to a remote facility. The session manager may define another connection that may "remove" a connection that may be determined to be totally invalid. In an exemplary embodiment, a connection that is "removed" may be completely closed so that it may not be reused.

Activation module 205 may provide a mechanism to implement an activation interface as described above with respect to activation module 504.

Execution module 206 may provide an interface that enables users of network management system to interact with network elements and/or other remote facilities (e.g., other systems 105). As such execution module 206 may enable execution of commands to a network element or other device. To do so, execution module 206 may provide a mechanism to receive one or more commands to be executed and pass the commands to an interface associated with the device on which the commands are to be executed, get a connection from a connection pool, process the list of commands based on the interface associated with the device on which the commands are to be executed, load the commands into work flow units, insert the connection into the work flow, and/or execute the work flow. In various exemplary embodiments, execution module 206 may execute commands based on a priority associated with the user and/or a priority associated with the command. For example, a user may be a high-priority user (e.g., an operations support user) and network troubleshooting commands executed by that user may be given a high priority. A user may also be a low-priority user (e.g., a provisioning system user) and provisioning commands executed by that user may be given a lower priority. In various exemplary embodiments, the priority of a user may be assigned dynamically.

In various exemplary embodiments, a network management system using a workflow management system (e.g., work flow management system 203) and an execution module (e.g., execution module 206), for example, may cooperate to provide recovery during work flow execution. For example, during an attempt to configure the network, if there is a communication failure, a connection is lost, an error message occurs, a problem is found on the stream, and/or any other like failure occurs during work flow execution, work flow execution may enter into a back out state in an attempt to recover from the failure. This recovery during work flow execution may be referred to herein as "rollback."

Network management systems according to exemplary embodiments of the disclosure may support symmetrical and/or asymmetrical rollback. Symmetrical rollback may refer to an instance where a single command may be recovered by executing a single rollback command. Asymmetrical rollback may refer to an instance where a single command may be recovered by executing multiple commands and/or an instance where multiple commands may be recovered by executing a single command.

Prior to execution, work flow may be referred to as "unassigned" work flow. Successful workflow, e.g., work flow that executes without any work units failing, may be referred to as "complete." During work flow execution, if one of the work units associated with a work flow fails, the work flow may enter a back out or recovery state. Upon entering a back out or recovery state, work flow may return to the last back out sync point to allow increment back outs or recoveries. To return to the last back out sync point, execution in the work flow may be tracked based on a distinguished state generated by each command. The distinguished state may define which command(s) need to be executed for recovery. For example, a work flow may be associated with three physical commands. The network management system may receive a response indicating a failure of the third command. The work unit may then associate itself with a failed state (e.g., a bad pattern). The failed state of the work unit may trigger a state change of the work flow to back out and/or recover (e.g., the distinguished state). Based on the distinguished state, the work units associated with the work flow may behave differently than the intended work flow (e.g., execute commands to recover).

Figure 7:
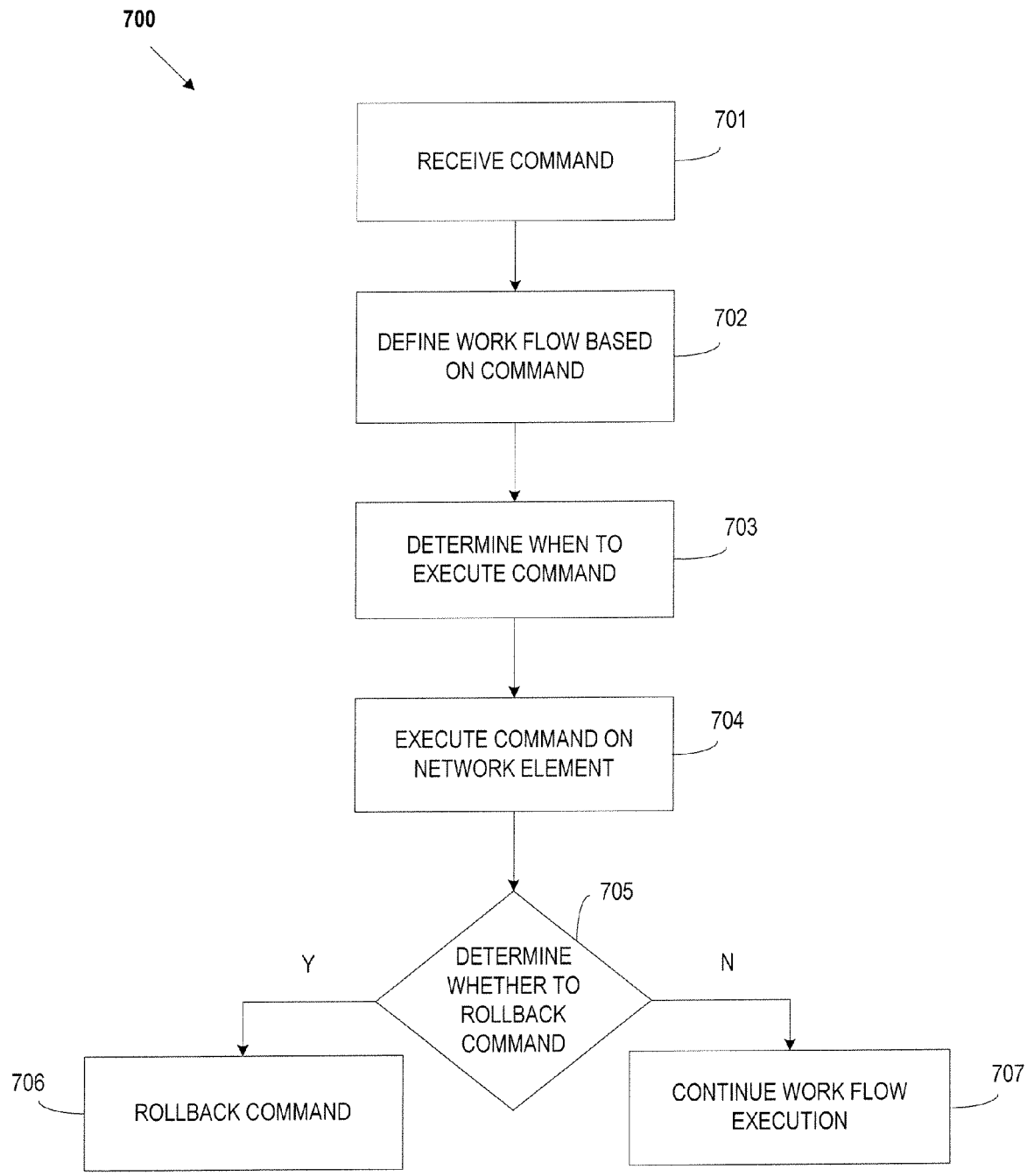
FIG. 7 illustrates an exemplary implementation of a method for dynamic work flow rollback according to an embodiment of the disclosure.

FIG. 7 depicts flow diagram 700 which illustrates an exemplary method for implementing dynamic rollback within a network management system. In block 701, a logical command may be received by the network management system. In various exemplary embodiments, the user may interact with a terminal interface (e.g., terminal tab 610) to input a command to be executed on a network element and/or an activation interface (e.g., activation module 504) to execute a script and/or template script that executes one or more commands on a network element. In various exemplary embodiments, the inputted command and/or the commands executed by the script may be logical commands associated with the network management system. As such, the logical commands may not be the actual physical commands to be executed on the network element.

In block 702, work flow may be defined based on the logical command. To define the workflow, a workflow management system (e.g., workflow management system 203) may define a workflow based on the logical command. In various exemplary embodiments, the workflow may include work units that are based on a configuration file associated with the network element on which the command is being executed. For example, a logical command may be a command to build video service. The workflow may be defined as work units associated with the physical commands to build the video service. The configuration file may enable the network management system to determine a script associated with building video service, use the script to lookup the physical commands for building the video service in the configuration file and introduce the physical commands into the work flow.

In block 703, the network management system may determine when to execute the command. In various exemplary embodiments, an execution module (e.g., execution module 206) may determine when to execute the command based on, for example, a priority associated with the user and/or the command and/or the availability of a connection to the network element.

In block 704, the command may be executed on the network element. In various exemplary embodiments, an execution module (e.g., execution module 206) may execute the physical command(s) included in the work units on the network element. To execute the physical command(s) on the network element, the execution module may obtain a direct connection to the network element from, for example, a connection pool, and communicate the physical command(s) to the network element.

In block 705, the network management system may determine whether to rollback the command. In various exemplary embodiments, network management system may determine whether to rollback the command by determining whether the a failure occurred. For example, the network management system may determine whether a communication failure occurred, a connection was lost, an error message occurred, a problem was found on the stream, a user forced a back out by executing a preemptive request to cause a recovery, test command are to be recovered, and/or any other like failure occurred during work flow execution.

In block 706, recovery (or rollback) may be performed. As noted above, execution in the work flow may be tracked based on a distinguished state generated by each command. The distinguished state may define which command(s) need to be executed for recovery. To perform the recovery, the network management system may execute those command(s) needed for recovery on the network element.

In block 707, work flow may continue based on a determination that the command does not require recovery.

In various exemplary embodiments, the network management system using a workflow management system (e.g., work flow management system 203) and an execution module (e.g., execution module 206), for example, may cooperate to provide dynamic transitioning during work flow execution. A network management system according to various embodiments of the disclosure may support static and/or dynamic work unit definitions. A static work unit definition, as referred to herein, may be a work unit definition that is fixed (e.g., predefined). A dynamic work unit definition, as referred to herein, may be a work unit definition that can interrogate and determine the state of the work flow and change state based on the determination.

Figure 8:
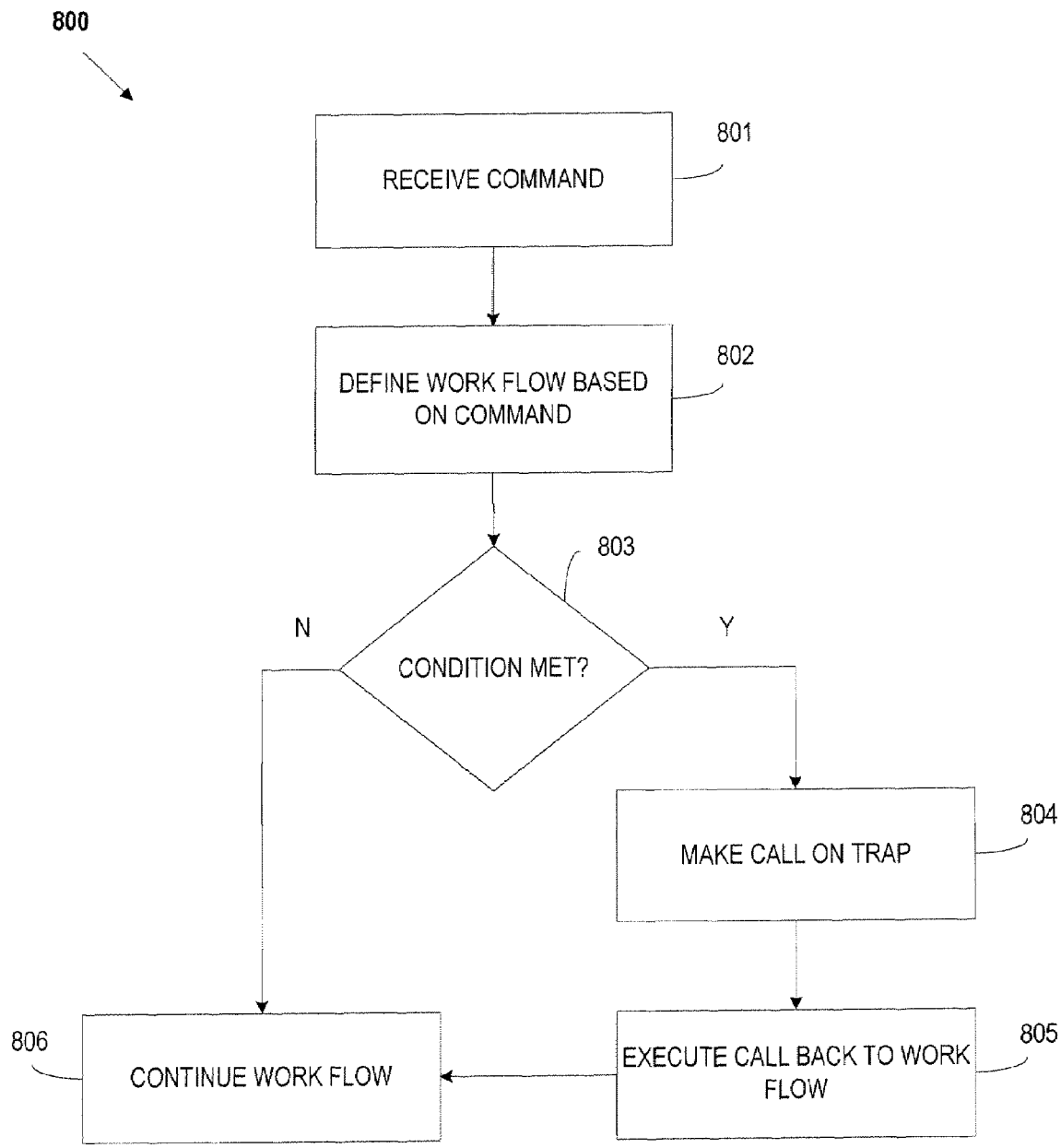
FIG. 8 illustrates an exemplary implementation of a method for dynamic work flow transitioning according to an embodiment of the disclosure.

FIG. 8 depicts flow diagram 800 which illustrates an exemplary method for implementing dynamic rollback within a network management system with blocks 801 802 operating as described above for blocks 701 and 702, respectively. Also, in block 802, when defining the work flow, a trap may be specified upon a certain condition. A trap may refer a programming code or signal that may be designed to capture errors and reveal where the errors are. A trap may also refer to a processor-generated exception. For example, a trap may be specified for when a network element fails and enters into a known state such as a communication failure.

In block 803, the network management system may determine whether the condition has been met. For example, while executing work flow, the network management system may monitor transition states of work units and based on the transition states, determine whether the condition has been met. Using the example described above, the network management may determine that the network element failed and entered into a communication failure.

In block 804, a work unit may be called on the trap. For example, when the network element enters into a communication failure, a call may be made to a work unit to re-establish communication with the network element.

In block 805, the work unit may execute a call back to the workflow. For example, the work unit may place a call back establishing communication with the network element.

In block 806, work flow may continue.

In various exemplary embodiments, other forms of dynamic transitioning may be supported by a network management system. For example, a network management system may support delayed transitions by placing timers on transitions. In these embodiments, if a failure occurs during work flow, timers may be specified in the work flow to determine when a retry may occur. Network management systems may also support pluggable, customizable transitions. In these embodiments, actions may be defined for when a particular state happens on a device. For example, when a work unit executes, the work unit may trigger another work unit to execute (e.g., when the state of the work unit triggers another work unit).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
 receiving a command associated with a network management system;
 defining a work flow based on the command, wherein the workflow includes one or more work units that are based on a configuration file associated with a network element in order to determine a script based on the configuration file associated with the network element;
 executing the work flow on the network element;
 monitoring transition states of the one or more work units in the workflow,
 determining whether a recovery is necessary, wherein the determining whether a recovery is necessary comprises determining whether conditions of an exception specified in the workflow have been met based at least in part on the transition states of the one or more work units; and
 performing a recovery based on a determination that a recovery is necessary.

2. The method according to claim 1, further comprising:
 determining when to execute the work flow.

3. The method according to claim 2, wherein the determination of when to execute the work flow is based on a priority of a user attempting to execute the command or the availability of a connection to the network element.

4. The method according to claim 1, further comprising:
 converting the command associated with the network management system into a command associated with the network element using the configuration file.

5. The method according to claim 4, wherein the one or more work units include the command associated with the network element.

6. The method according to claim 1, wherein a recovery is necessary if a failure associated with the network element occurs.

7. The method according to claim 1, further comprising:
defining one or more predetermined commands associated with recovery of the command; and
performing the recovery using the one or more predetermined commands.

8. A method, comprising:
receiving a command associated with a network management system;
defining a work flow based on the command, wherein the workflow includes one or more work units that are based on a configuration file associated with a network element in order to determine a script based on the configuration file associated with the network element;
executing the work flow on the network element;
monitoring transition states of the one or more work units in the workflow;
determining whether a condition of an exception specified in the workflow has been met based at least in part on the transition states of the one or more work units;
calling a work unit associated with the exception based on a determination that the condition has been met; and
executing the work unit associated with the exception.

9. The method according to claim 8, further comprising:
converting the command associated with the network management system into a command associated with the network element using the configuration file.

10. The method according to claim 9, wherein the one or more work units include the command associated with the network element.

11. A system, comprising:
a network management system to receive a command associated with the network management system and define a work flow based on the command, wherein the workflow includes one or more work units that are based on a configuration file associated with a network element in order to determine a script based on the configuration file associated with the network element; and
an execution module to execute the work flow on the network element,
wherein during execution of the work flow, the network management system monitors transition states of the one or more work units in the workflow and determines whether a recovery is necessary by determining whether conditions of an exception specified in the workflow have been met based at least in part on the transition states of the one or more work units, and performs a recovery based on a determination that a recovery is necessary.

12. The system according to claim 11, wherein the network management system determines when to execute the work flow.

13. The system according to claim 12, wherein the determination of when to execute the work flow is based on a priority of a user attempting to execute the command or the availability of a connection to the network element.

14. The system according to claim 11, wherein the network management system converts the command associated with the network management system into a command associated with the network element using the configuration file.

15. The system according to claim 14, wherein the one or more work units include the command associated with the network element.

16. The system according to claim 11, wherein a recovery is necessary if a failure associated with the network element occurs.

17. The system according to claim 11, wherein the network management system defines one or more predetermined commands associated with recovery of the command and performs the recovery using the one or more predetermined commands.

18. The system according to claim 11, wherein the network management system comprises computer readable code stored in an electronic storage medium adapted to cause a processor to receive a command associated with the network management, define a work flow based on the command, determine whether a recovery is necessary and perform a recovery based on a determination that a recovery is necessary.

19. The system according to claim 11, wherein the execution module comprises computer readable code stored in an electronic storage medium adapted to cause a processor to execute the work flow on a network element.

20. A system, comprising:
a network management system to receive a command associated with a network management system and define a work flow based on the command, wherein the workflow includes one or more work units that are based on a configuration file associated with a network element in order to determine a script based on the configuration file associated with the network element; and
an execution module to execute the work flow on the network element,
wherein, during execution of the work flow, the network management system monitors transition states of the one or more work units in the workflow, determines whether a condition of an exception specified in the workflow has been met based at least in part on the transition states of the one or more work units, calls a work unit associated with the exception based on a determination that the condition has been met, and wherein the execution module executes the work unit associated with the exception.

21. The system according to claim 20, wherein the network management system converts the command associated with the network management system into a command associated with the network element using the configuration file.

22. The system according to claim 21, wherein the one or more work units include the command associated with the network element.

23. The system according to claim 20, wherein the network management system comprises computer readable code stored in an electronic storage medium adapted to cause a processor to receive a command associated with the network management, define a work flow based on the command, determine whether a condition has been met and call a work unit associated with an exception based on a determination that the condition has been met.

24. The system according to claim 20, wherein the execution module comprises computer readable code stored in an electronic storage medium adapted to cause a processor to execute the work flow on a network element and execute the work unit associated with the exception.

* * * * *